US012719373B2

(12) United States Patent
Li

(10) Patent No.: US 12,719,373 B2

(45) Date of Patent: Aug. 25, 2026

(54) MULTI-CONVERTER POWER SUPPLY

(71) Applicant: Chengdu Monolithic Power Systems Co., Ltd., Chengdu (CN)

(72) Inventor: Hui Li, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 152 days.

(21) Appl. No.: 18/898,443

(22) Filed: Sep. 26, 2024

(65) Prior Publication Data

US 2025/0105749 A1 Mar. 27, 2025

(30) Foreign Application Priority Data

Sep. 27, 2023 (CN) ......................... 202311266272.1

(51) Int. Cl.
*H02M 3/335* (2006.01)
*H02M 1/00* (2006.01)

(52) U.S. Cl.
CPC ..... *H02M 3/33515* (2013.01); *H02M 1/0006* (2021.05); *H02M 1/0043* (2021.05); *H02M 1/0077* (2021.05)

(58) Field of Classification Search
CPC ......... H02M 3/33515; H02M 3/33523; H02M 3/3353; H02M 3/33538; H02M 3/33546; H02M 3/33553; H02M 3/33561; H02M 3/33569; H02M 3/33571; H02M 3/33573; H02M 3/33576; H02M 1/0043; H02M 1/0045; H02M 1/0006; H02M 1/0077; H02M 1/0003; H02M 1/008; H02M 1/009; H02M 1/0074; H02M 1/0067
See application file for complete search history.

(56) References Cited

U.S. PATENT DOCUMENTS

2008/0303495 A1* 12/2008 Wei ........................ H02M 7/003 323/272
2011/0007527 A1* 1/2011 Liu ................... H02M 3/33561 363/21.02
2020/0220469 A1* 7/2020 Morrison .......... H02M 3/33553
2022/0166325 A1 5/2022 Wang

* cited by examiner

*Primary Examiner* — Nguyen Tran
(74) *Attorney, Agent, or Firm* — Ashurst Perkins Coie US LLP

(57) ABSTRACT

The multi-converter power supply has a first port, a second port, a second switching converter, one or more additional switching converters and an integrated control circuit. The first switching converter receives an input voltage and to convert the input voltage into a first output voltage. The second switching converter receives the input voltage and converts the input voltage into a second output voltage. The one or more additional switching converters are selectively activated. The integrated control circuit comprises a first pin, a second pin, one or more output pins, a load condition detect unit, a first switching control unit, a first power distribution control unit and a second power distribution control unit.

20 Claims, 6 Drawing Sheets

MULTI-CONVERTER POWER SUPPLY

CROSS-REFERENCE TO RELATED APPLICATIONS

This application claims the benefit of CN application No. 202311266272.1, filed on Sep. 27, 2023, and incorporated herein by reference.

BACKGROUND OF THE INVENTION

1. Field of the Invention

The present invention generally relates to electronic circuits, and more particularly but not exclusively relates to multi-converter power supplies.

2. Description of Related Art

Conventional solutions for multiple output power delivery (PD) adapters typically employ a two-stage design to convert an input power to an expected output power. A first stage power converter (e.g., a flyback converter or an LLC resonant converter) can convert high voltage alternating current (AC) power to lower voltage direct current (DC) power. A second stage power converter (e.g., a buck converter) can convert power output from the first stage to different DC power to meet different requirements.

However, not all outputs need to be loaded at the same time, and power requirements of electronic devices can vary greatly during operation of the electronic devices. As the number or characteristics of a load changes, the power requirements also change. Multi-stage power converters capable of handling various power requirements may be difficult to design, expensive, and/or inefficient to implement, particularly when multi-stage converters have to meet different requirements in order to be compatible with each other.

SUMMARY OF THE INVENTION

It is one of the objects of the present invention to provide a multi-converter power supply.

One embodiment of the present invention discloses an integrated control circuit for a multi-converter power supply. The integrated control circuit has a first pin, a second pin, one or more output pins, a load condition detect unit, a first switching control unit, a first power distribution control unit and a second power distribution control unit. The first pin is used to receiving a mode signal. The mode signal controls the multi-converter power supply to operate in a first power supply mode or a second power supply mode. The second pin is used to receiving a first feedback signal representing a first output voltage provided by a first switching converter of the multi-converter power supply. The one or more output pins are used to provide one or more set signals. The load condition detect unit judges a load condition at a first port of the multi-converter power supply based on the first feedback signal. The first switching control unit is used to generate a first control signal based on the first feedback signal for controlling a first switch of the first switching converter. The first power distribution control unit is used to determine whether to activate a second switching converter of the multi-converter power supply based on the load condition when the multi-converter power supply operates in the first power supply mode. When the second switching converter is activated, the outputs of the second switching converter and the first switching converter are connected in parallel, and the second switching converter and the first switching converter operate interleaved with each other to provide power for the first port. The second power distribution control unit is used to determine whether to activate one or more additional switching converters of the multi-converter power supply based on the load condition when the multi-converter power supply operates in the first power supply mode. The second power distribution control unit is used to generate the one or more set signals. When the one or more additional switching converters are activated, the output terminals of the one or more additional switching converters are connected in parallel with output terminals of the first switching converter and the second switching converter to provide power to the first port.

Another embodiment of the present invention discloses a multi-converter power supply. The multi-converter power supply has a first port, a second port, a second switching converter, one or more additional switching converters and an integrated control circuit. The first switching converter receives an input voltage and to convert the input voltage into a first output voltage. The second switching converter receives the input voltage and converts the input voltage into a second output voltage. The one or more additional switching converters are selectively activated. The integrated control circuit has a first pin, a second pin, one or more output pins, a load condition detect unit, a first switching control unit, a first power distribution control unit and a second power distribution control unit. The first pin is used to receiving a mode signal. The mode signal controls the multi-converter power supply to operate in a first power supply mode or a second power supply mode. The second pin is used to receiving a first feedback signal representing a first output voltage. The one or more output pins are used to provide one or more set signals. The load condition detect unit is activated when the multi-converter power supply operates in the first power supply mode. The load condition detect unit judges a load condition at the first port based on the first feedback signal. The first switching control unit is used to generate a first control signal based on the first feedback signal for controlling a first switch of the first switching converter. The first power distribution control unit is used to determine whether to activate a second switching converter based on the load condition when the multi-converter power supply operates in the first power supply mode. When the second switching converter is activated, the outputs of the second switching converter and the first switching converter are connected in parallel, and the second switching converter and the first switching converter operate interleaved with each other to provide power for the first port. The second power distribution control unit is used to determine whether to activate one or more additional switching converters of the multi-converter power supply based on the load condition when the multi-converter power supply operates in the first power supply mode. The second power distribution control unit is further used to generate the one or more set signals. When the one or more additional switching converters are activated, output terminals of the one or more additional switching converters are connected in parallel with output terminals of the first switching converter and the second switching converter to provide power to the first port.

Yet another embodiment of the present invention discloses a control method for a multi-converter power supply. The control method includes receiving a mode signal, receiving a first feedback signal and determining a load condition at a first port of the multi-converter power supply based on a first feedback signal when the multi-converter power supply operates in the first power supply mode. The mode signal controls the multi-converter power supply to operate in a first power supply mode or a second power supply mode. The first feedback signal represents a first output voltage provided by a first switching converter of the multi-converter power supply. When a light load condition is detected, generating a first control signal based on the first feedback signal to control a first switching converter of the multi-converter power supply to provide power to the first port. When a medium load condition is detected, activating a second switching converter of the multi-converter power supply to perform power operation, wherein when the second switching converter is activated, outputs of the first switching converter and the second switching converter are connected in parallel, and the first switching converter and the second switching converter operate interleaved with each other to provide power for the first port. When a heavy load condition is detected, activating one or more additional switching converters to perform power operation, wherein when the one or more additional switching converters are activated, outputs of the additional switching converter, the first switching converter and the second switching converter are connected in parallel to provide power to the first port.

These and other features of the present invention will be readily apparent to persons of ordinary skill in the art upon reading the entirety of this disclosure, which comprises the accompanying drawings and claims.

BRIEF DESCRIPTION OF DRAWINGS

The present invention can be further understood with reference to the following detailed description and the appended drawings, wherein like elements are provided with like reference numerals.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Reference to "one embodiment", "an embodiment", "an example" or "examples" means: certain features, structures, or characteristics are contained in at least one embodiment of the present invention. These "one embodiment", "an embodiment", "an example" and "examples" are not necessarily directed to the same embodiment or example. Furthermore, the features, structures, or characteristics may be combined in one or more embodiments or examples. In addition, it should be noted that the drawings are provided for illustration, and are not necessarily to scale. And when an element is described as "connected" or "coupled" to another element, it can be directly connected or coupled to the other element, or there could exist one or more intermediate elements. In contrast, when an element is referred to as "directly connected" or "directly coupled" to another element, there is no intermediate element. When a signal is described as "equal to" another signal, it is substantially identical to the other signal.

Figure 1:
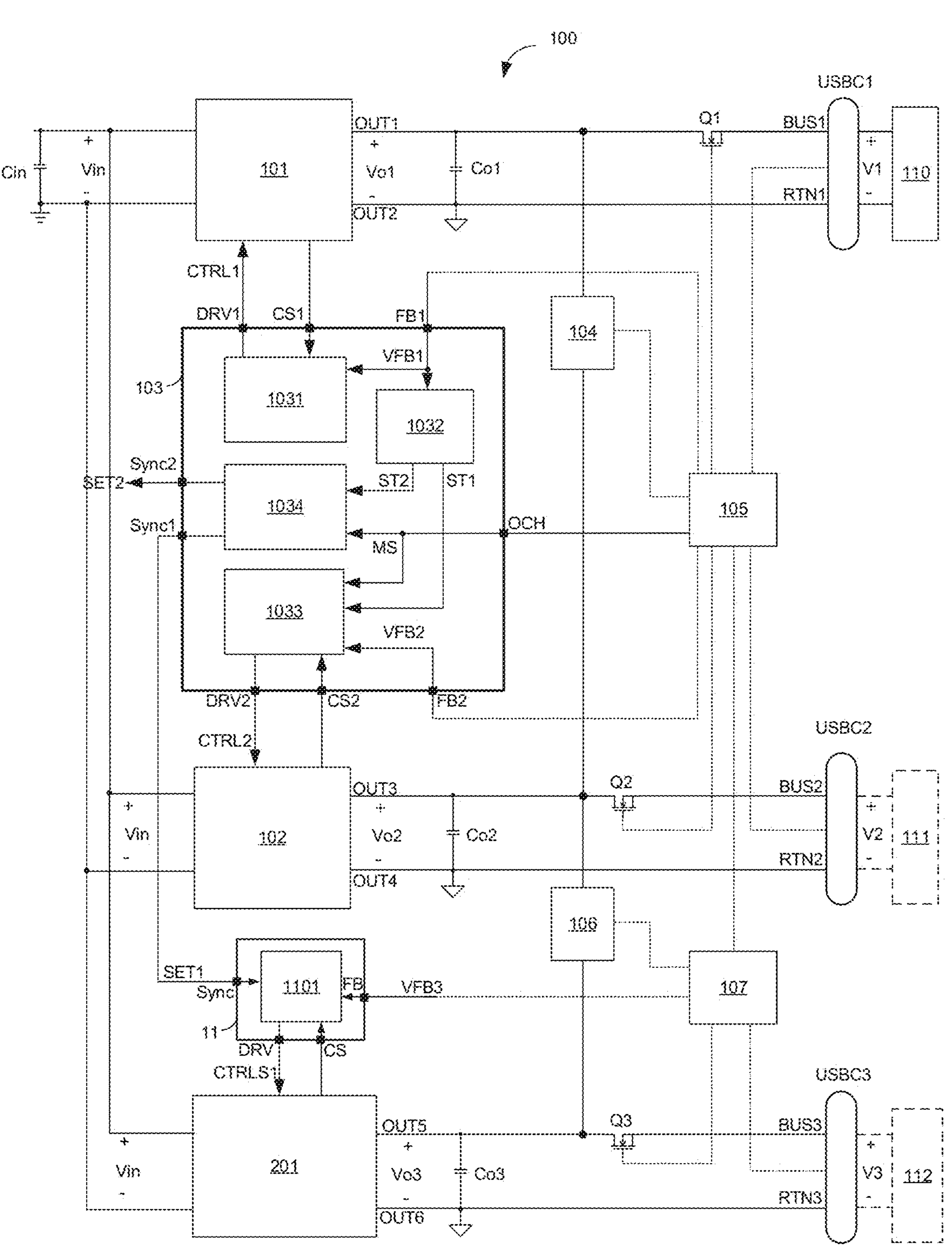
FIG. 1 schematically illustrates a circuit diagram of a multi-converter power supply 100 in accordance with an embodiment of the present invention.

FIG. 1 schematically illustrates a circuit diagram of a multi-converter power supply 100 in accordance with an embodiment of the present invention. In an embodiment shown in FIG. 1, the multi-converter power supply 100 has only three ports (USBC1-USBC3) for output. In the other embodiments, the multi-converter power supply 100 includes additional output(s) and/or output(s) other than USB ports.

In the embodiment shown in FIG. 1, the multi-converter power supply 100 includes a first switching converter 101, a second switching converter 102, a third switching converter 201, a first port USBC1, a second port USBC2, a third port USBC3, an integrated control circuit 103, a third controller 11, a load switch 104, a load switch 106, a power delivery (PD) controller 105 and a power delivery controller 107.

As shown in FIG. 1, the first switching converter 101 has a first input terminal, a second input terminal, a first output terminal OUT1, and a second output terminal OUT2. The first input terminal and the second input terminal of the first switching converter 101 are coupled across an input capacitor Cin respectively to receive an input voltage Vin. The first switching converter 101 converts the input voltage Vin to a first output voltage Vo1 and provides the first output voltage Vo1 to the first output terminal OUT1 and the second output terminal OUT2. The second switching converter 102 has a first input terminal, a second input terminal, a third output terminal OUT3 and a fourth output terminal OUT4. The first input terminal and the second input terminal of the second switching converter 102 are coupled across the input capacitor Cin respectively to receive the input voltage Vin. The second switching converter 102 converts the input voltage Vin to a second output voltage Vo2 and provides the second output voltage Vo2 to the third output terminal OUT3 and the fourth output terminal OUT4. The second output terminal OUT2 is coupled to the fourth output terminal OUT4 and grounded together.

The third switching converter 201 has a first input terminal, a second input terminal, a fifth output terminal OUT5 and a sixth output terminal OUT6. The first input terminal and the second input terminal of the third switching converter 201 are coupled across the input capacitor Cin respectively to receive the input voltage Vin. The third switching converter 201 converts the input voltage Vin into a third output voltage Vo3 and provides the third output voltage Vo3 to the fifth output terminal OUT5 and the sixth output terminal OUT6. In one embodiment, the sixth output terminal OUT6 is coupled to the fourth output terminal OUT4 and grounded together. The third switching converter 201 is controlled by the third controller 11.

In one embodiment, the input capacitor Cin is configured to receive a high voltage input. In some embodiments, the high voltage input is an alternating current (AC) input, such as a line voltage. In the other embodiments, the high voltage input is a high voltage direct current (DC) input, such as an EMI filtered and rectified line voltage.

In order to filter ripple and stabilize the output voltage, both output terminals of the first switching converter 101, the second switching converter 102 and the third switching converter 201 are coupled to an output capacitor respectively. As shown in FIG. 1, an output capacitor Co1 is coupled between the first output terminal OUT1 and the second output terminal OUT2 of the first switching converter 101 to receive the first output voltage Vo1. An output capacitor Co2 is coupled between the third output terminal OUT3 and the fourth output terminal OUT4 of the second switching converter 102 to receive the second output voltage Vo2. An output capacitor Co3 is coupled between the fifth output terminal OUT5 and the sixth output terminal OUT6 of the third switching converter 201 to receive the third output voltage Vo3. Considering factors such as capacity, price and volume, the output capacitors are generally made of electrolytic capacitors, such as aluminum electrolytic capacitors.

The first port USBC1 has a bus terminal BUS1 and a ground terminal RTN1, and the bus terminal BUS1 receives a first voltage V1 and the ground terminal RTN1 is coupled to ground. The second port USBC2 has a bus terminal BUS2 and a ground terminal RTN2, and the bus terminal BUS2 receives a second voltage V2 and the ground terminal RTN2 is coupled to ground. The third port USBC3 has a bus terminal BUS3 and a ground terminal RTN3, and the bus terminal BUS3 receives a third voltage V3, and the ground terminal RTN3 is coupled to ground. In one embodiment, all of the first port USBC1, the second port USBC2 and the third port USBC3 are Type-C ports.

In some cases, at least one port is not connected to an external electronic device. In one embodiment, only the first port USBC1 is coupled to a first electronic device, the second port USBC2 is disconnected from a second electronic device 111, and the third port USBC3 is also disconnected from a third electronic device 112. For example, as shown in FIG. 1, the connection of the second port USBC2 and the second electronic device 111, the connection of the third port USBC3 and the third electronic device 112 are indicated by dashed lines. In another embodiment, the first port USBC1 is coupled to the first electronic device 110, the second port USBC2 is coupled to the second electronic device 111, and the third port USBC3 is disconnected from the third electronic device 112.

The power delivery controller 105 is coupled to the first port USBC1 and the second port USBC2. In response to a load information received from the first port USBC1 and the second port USBC2, the power delivery controller 105 determines the multi-converter power supply 100 operate in a first power supply mode or a second power supply mode, and provides a mode signal MS. In one embodiment, when only the first port USBC1 is coupled to the first electronic device 110 and neither the second port USBC2 nor the third port USBC3 is coupled to the electronic device, the integrated control circuit 103 controls the multi-converter power supply 100 to operate in the first power supply mode. In another embodiment, when all ports are floating, i.e. no load, the integrated control circuit 103 controls the multi-converter power supply 100 to operate in the first power supply mode. When the first port USBC1 is coupled to the first electronic device 110 and the second port USBC2 is coupled to the second electronic device 111, the integrated control circuit 103 controls the multi-converter power supply 100 to operate in the second power supply mode.

The power delivery controller 105 is configured to control selection switches Q1 and Q2 and the load switch 104. The power delivery controller 105 detects power requirements of respective ports USBC1 and USBC2 and customizes power outputs of the respective ports USBC1 and USBC2. In this manner, various power requirements for different numbers of loads are met. The selection switch Q1 is coupled between the first output terminal OUT1 and the bus terminal BUS1, and the selection switch Q2 is coupled between the third output terminal OUT3 and the bus terminal BUS2. The power delivery controller 105 controls the selection switch Q1 and the selection switch Q2 based on the power supply mode and the power requirements. The power delivery controller 105 is further configured to provide a first feedback signal VFB1 representing the first output voltage Vo1 and a second feedback signal VFB2 representing the second output voltage Vo2.

The power delivery controller 107 is coupled to the power delivery controller 105 and the third port USBC3, and determines the multi-converter power supply 100 operates in the first power supply mode or the second power supply mode, or another power supply mode in response to the load information received from each port. The power delivery controller 107 is configured to control a selection switch Q3 and the load switch 106. The power delivery controller 107 also provides a third feedback signal VFB3 representing the third output voltage Vo3.

The first switching converter 101 and the second switching converter 102 could have the same topology. In one embodiment, both the first switching converter 101 and the second switching converter 102 are flyback converters. Both the first switching converter 101 and the second switching converter 102 are controlled by the integrated control circuit 103. In one embodiment, the integrated control circuit 103 provides a first control signal CTRL1 and a second control signal CTRL2 to control a first switch of the first switching converter 101 and a second switch of the second switching converter 102 respectively. In another embodiment, the integrated control circuit 103 is integrated on the same chip with the first switch and the second switch.

In the embodiment shown in FIG. 1, the integrated control circuit 103 includes a first switching control circuit 1031, a load condition detect unit 1032, a first power distribution control unit 1033, a second power distribution control unit 1034 and a plurality of pins. In the integrated control circuit 103, the plurality of pins include a first feedback pin FB1, a second feedback pin FB2, a mode indicating pin OCH, a first drive pin DRV1, a first current sense pin CS1, a second drive pin DRV2, a second current sense pin CS2, first output pin Sync1 and a second output pin Sync2. The first feedback pin FB1 is coupled to the power delivery controller 105 and receives the first feedback signal VFB1 representing the first output voltage Vo1. The second feedback pin FB2 is coupled to the power delivery controller 105 and receives the second feedback signal VFB2 representing the second output voltage Vo2. The mode indicating pin OCH is coupled to the power delivery controller 105 as well and receives the mode signal MS controlling the multi-converter power supply 100 to operate in the first power supply mode or the second power supply mode.

In the embodiment shown in FIG. 1, the first switching control unit 1031 generates the first control signal CTRL1 based on the first feedback signal VFB1 to control the first switch of the first switching converter 101. The selection switch Q1 coupled between the first output terminal OUT1 and the bus terminal BUS1 is turned on, and the first switching converter 101 supplies power to the first port USBC1.

When the multi-converter power supply 100 operates in the first power supply mode, the load condition detect unit 1032 is activated. The load condition detect unit 1032 judges a load condition of the first electronic device 110 coupled to the first port USBC1 based on the first feedback signal VFB1. In one embodiment, the load condition detect unit 1032 compares the first feedback signal VFB1 with a first feedback threshold Vth_1 and a second feedback threshold Vth_2, and provides a first condition signal ST1 and a second condition signal ST2 at output terminals of the load condition detect unit 1032. When the first condition signal ST1 is logic low level, the first electronic device 110 is in the light load condition or no load is coupled to the first port USBC1. When the first condition signal ST1 is logic high level, the first electronic device 110 is in the medium load condition. When the second condition signal ST2 changes from logic low level to logic high level, the first electronic device 110 is in the heavy load condition.

In one embodiment, if the current required by the first electronic device 110 is less than the first current threshold, it indicates that the first electronic device 110 is in the light load condition or no load condition. If the current required by the first electronic device 110 is greater than the first current threshold and less than the second current threshold, it indicates that the first electronic device 110 is in the medium load condition. And if the current required by the first electronic device 110 is greater than the second feedback threshold, it indicates that the first electronic device 110 is in the heavy load condition. Herein, the first current threshold is less than the second current threshold.

When the multi-converter power supply 100 operates in the first power supply mode, the first power distribution control unit 1033 determines whether to activate the second switching converter 102 for power operation based on the load condition of the first electronic device 110. When the multi-converter power supply 100 operates in the first power supply mode and the first electronic device 110 is in the medium load condition or the heavy load condition, the load switch 104 coupled between the first output terminal OUT1 and the third output terminal OUT3 is turned on, and the second switching converter 102 is activated. In this case, both the first output terminal OUT1 and the third output terminal OUT3 are coupled to the bus terminal BUS1 of the first port USBC1. The integrated control circuit 103 controls the first switching converter 101 and the second switching converter 102 to operate interleaved with each other based on the first feedback signal VFB1. So that the first switching converter 101 and the second switching converter 102 provide power to the first port USBC1 together. Thereby providing double current load capability to the first electronic device 110.

When the multi-converter power supply 100 operates in the first power supply mode, the second power distribution control unit 1034 determines whether to further activate the third switching converter 201 for power operation based on the load condition, and generates a first set signal SET1. The first set signal SET1 is provided to the first output pin Sync1 to activate the third switching converter 201. When the third switching converter 201 is activated, the load switch 106 coupled between the third output terminal OUT3 and the fifth output terminal OUT5 is turned on by the power delivery controller 107. The outputs of the activated third switching converter 201 are in parallel with the outputs of the first switching converter 101 and the second switching converter 102. The first switching converter 101, the second switching converter 102, and the third switching converter 201 provide higher power and stronger load current capability together for the first port USBC1.

When the multi-converter power supply 100 operates in the second power supply mode, the load switch 104 coupled between the first output terminal OUT1 and the third output terminal OUT3 is turned off, the load switch 106 coupled between the third output terminal OUT3 and the fifth output terminal OUT5 is turned off, the selection switch Q1 coupled between the first output terminal OUT1 and the bus terminal BUS1 remained on, and the selection switch Q2 coupled between the third output terminal OUT3 and the bus terminal BUS2 is turned on. In such an embodiment, the third output terminal OUT3 is decoupled from the bus terminal BUS1 and the first output terminal OUT1, and then coupled to the bus terminal BUS2 of the second port USBC2, the fifth output terminal OUT5 is decoupled from the bus terminal BUS1 and the third output terminal OUT3. When the multi-converter power supply 100 operates in the second power supply mode, the first switching control unit 1031 controls the first switching converter 101 to provide the first output voltage Vo1 based on the first feedback signal VFB1 to power the first electronic device 110. The first output voltage Vo1 is provided as the first voltage V1 supplied to the first port USBC1. At the same time, the first power distribution control unit 1033 controls the second switching converter 102 to provide the second output voltage Vo2 based on the second feedback signal VFB2. The second output voltage Vo2 is provided as the second voltage V2 supplied to the second port USBC2. The second power distribution control unit 1034 is deactivated when the multi-converter power supply 100 operates in the second power supply mode, in this case the first set signal SET1 of the third switching converter 201 is zero.

The third controller 11 is used for controlling the third switching converter 201. The third controller 11 has a switching control circuit 1011 and a plurality of pins, the plurality of pins includes a synchronization pin Sync, a feedback pin FB, a drive pin DRV and a current sense pin CS. The synchronization pin Sync is coupled to the first output pin Sync1 corresponding to the integrated control circuit 103, and receives the corresponding first set signal SET1 when the multi-converter power supply 100 operates in the first power supply mode and the first electronic device 110 is in the heavy load condition. The feedback pin FB is coupled to the power delivery controller 107 and receives the third feedback signal VFB3 representing the third output voltage Vo3. The switching control circuit 1101 provides a third control signal CTRLS1 to the drive pin DRV based on the first set signal SET1 or the third feedback signal VFB3 to control a power switch of the third switching converter 201. When the switching control circuit 1101 receives a normal first set signal SET1, the switching control circuit 1101 generates the third control signal CTRLS1 based on the first set signal SET1 to control the third switching converter 201 to supply power to the first port USBC1. If the first set signal SET1 is not received within a preset time period, it indicates that the third switching converter 201 is not activated by the integrated control circuit 103. Subsequently, when the switching control circuit 1101 detects that the third feedback signal VFB3 changes from logic high level to logic low level, it indicates that the third port USBC3 needs to be powered by the third switching converter 201. In this case, the third switching converter 201 generates the third control signal CTRLS1 based on the third feedback signal VFB3, the selection switch Q3 is turned on, and the third switching converter 201 supplies power to the third port USBC3.

According to an embodiment of the present invention, in order to meet the change in the power requirements, when the multi-converter power supply 100 operates in the first power supply mode, the integrated control circuit 103 may self-regulate the power provided by the multi-converter power supply in a way that increases or decreases the number of the switching converters performing the power operation. Under no load or light load, only the first switching converter 101 in the multi-converter power supply 100 is under power operation to transfer energy to a load.

Figure 2:
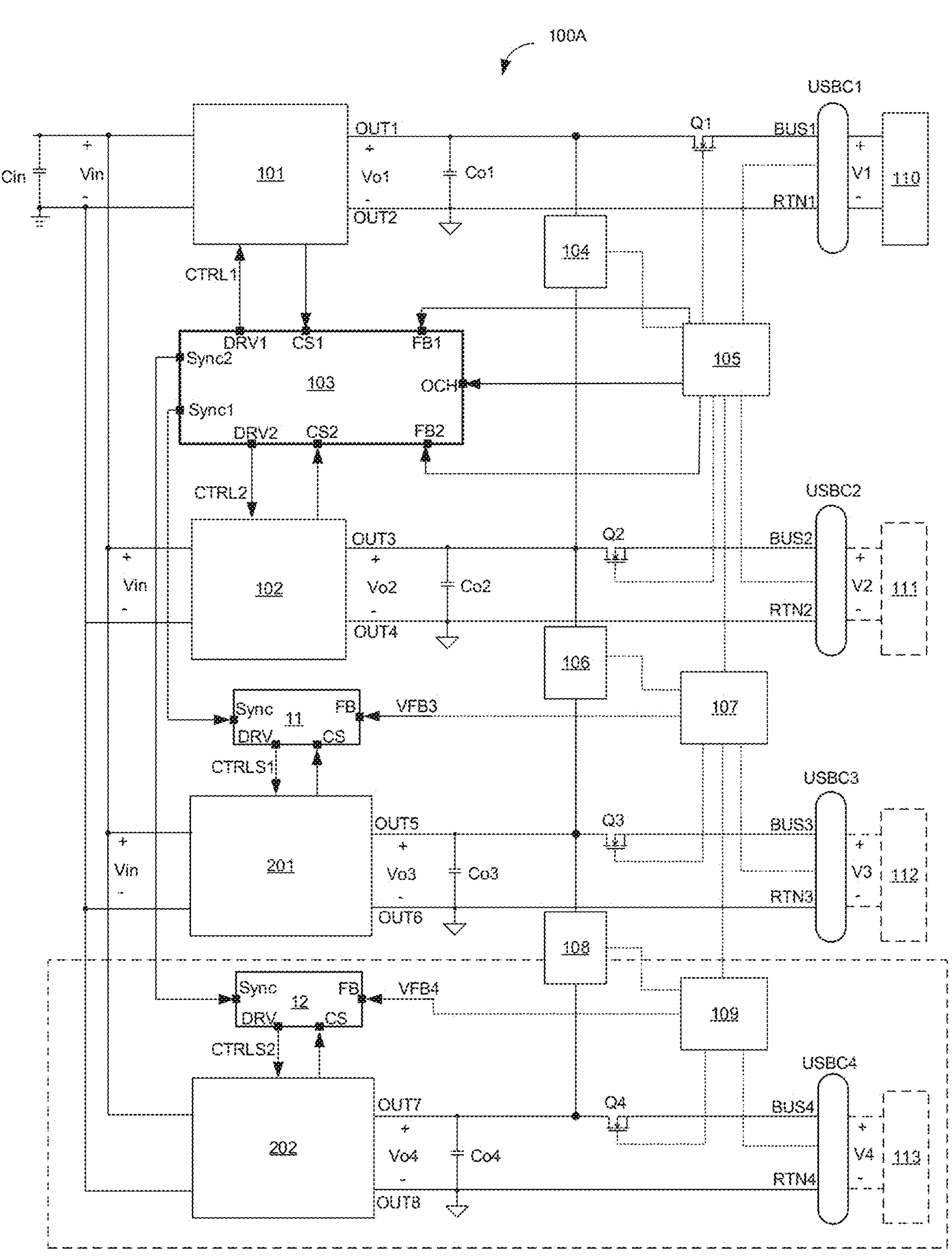
FIG. 2 schematically illustrates a circuit diagram of a multi-converter power supply 100A in accordance with an embodiment of the present invention.

FIG. 2 schematically illustrates a circuit diagram of a multi-converter power supply 100A in accordance with an embodiment of the present invention. Compared to the multi-converter power supply 100 shown in FIG. 1, the multi-converter power supply 100A shown in FIG. 2 further comprises a fourth switching converter 202, a fourth controller 12, a load switch 108, a power delivery controller 109 and a fourth port USBC4. In one embodiment, the first port USBC1 is coupled to the first electronic device 110, the second port USBC2 is coupled to the second electronic device 111, the third port USBC3 is coupled to the third electronic device 112, and the fourth port USBC4 is coupled to a fourth electronic device 113.

The fourth switching converter 202 has a first input terminal, a second input terminal, a seventh output terminal OUT7 and an eighth output terminal OUT8. The first input terminal and the second input terminal of the fourth switching converter 202 are coupled across the input capacitor Cin to receive the input voltage Vin. The fourth switching converter 202 converts the input voltage Vin into a fourth output voltage Vo4 and provides the fourth output voltage Vo4 to the seventh output terminal OUT7 and the eighth output terminal OUT8. The fourth switching converter 202 is controlled by the fourth controller 12. The output capacitor Co4 is coupled between the seventh output terminal OUT7 and the eighth output terminal OUT8 of the fourth switching converter 202 to receive the fourth output voltage Vo4.

The fourth port USBC4 has a bus terminal BUS4 and a ground terminal RTN4. The bus terminal BUS4 receives the fourth voltage V4 and the ground terminal RTN1 is coupled to ground. The power delivery controller 109 is coupled to the fourth port USBC4 and the power delivery controller 107 to provide a fourth feedback signal VFB4 representing the fourth output voltage Vo4 in response to load information received at each port. The power delivery controller 109 is configured to control a selection switch Q4 and the load switch 108.

The fourth controller 12 has substantially the same structure as the third controller 11 shown in FIG. 1, differing merely in that a synchronization pin Sync of the fourth controller 12 is coupled to the second output pin Sync2 of the integrated control circuit 103 to receive a second set signal SET2. A switching control circuit of the fourth controller 12 generates a fourth control signal CTRLS2 based on the second set signal SET2 or a fourth feedback signal VFB4 representing the fourth output voltage Vo4 to control the power switch.

Figure 3:
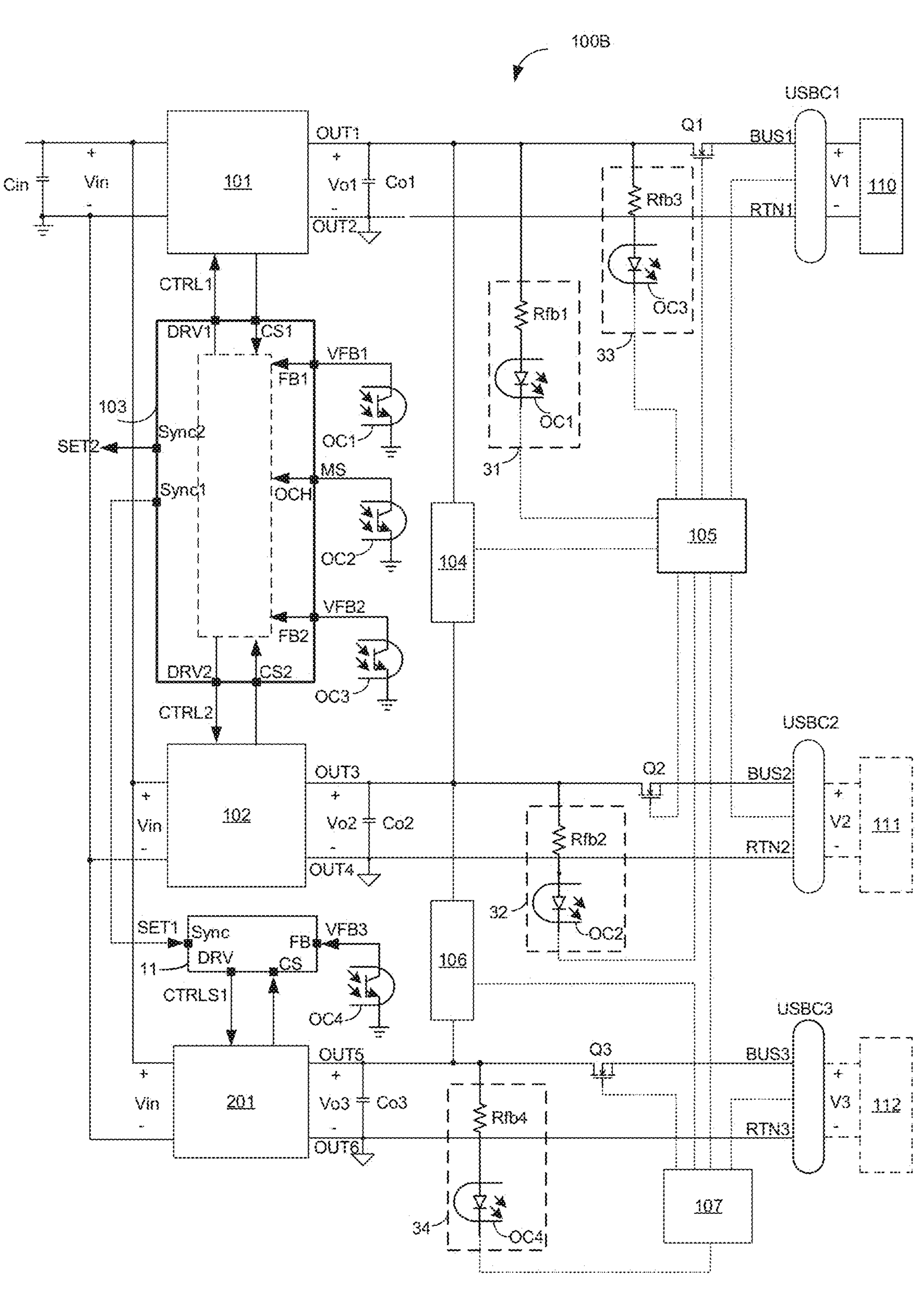
FIG. 3 schematically illustrates a circuit diagram of a multi-converter power supply 100B in accordance with an embodiment of the present invention.

FIG. 3 schematically illustrates a circuit diagram of a multi-converter power supply 100B in accordance with an embodiment of the present invention. Compared to the multi-converter power supply 100 shown in FIG. 1, the multi-converter power supply 100B shown in FIG. 3 further includes a first isolated delivery path 31, a second isolated delivery path 32, a third isolated delivery path 33, and a fourth isolated delivery path 34.

The isolated delivery paths are required when detection of the first power supply mode and the second power supply mode, and detection of the respective output voltage occur on a secondary side of the switching converter. In some embodiments, the isolated delivery path may include an optocoupler, a transformer, a capacitive isolation device, or any other suitable electrical isolation device.

In the embodiment shown in FIG. 3, the first feedback pin FB1 of the integrated control circuit 103 receives the first feedback signal VFB1 via the first isolated delivery path 31. The first feedback signal VFB1 is an error amplifying signal of the first output voltage Vo1. Specifically, the first isolated delivery path 31 includes a feedback resistor Rfb1, a photocoupler OC1, and a three-terminal adjustable voltage regulator device (not shown). In one embodiment, the three-terminal adjustable voltage regulator device is integrated within the power delivery controller 105. The photocoupler OC1 comprises a photosensitive diode and a photosensitive transistor. The photosensitive diode has an anode and a cathode, the anode is coupled to the first output terminal OUT1 via the feedback resistor Rfb1, and the cathode is coupled to one terminal of the power delivery controller 105. When the multi-converter power supply 100B operates in the first power supply mode or the second power supply mode, the power delivery controller 105 converts the error amplifying signal of the first output voltage Vo1 to a current flowing through the photosensitive diode. The photosensitive transistor is coupled between the first feedback pin FB1 of the integrated control circuit 103 and the second input terminal of the first switching converter 101. The photosensitive transistor provides the first feedback signal VFB1 in response to the current flowing through the photosensitive diode, the first feedback signal VFB1 is input to the integrated control circuit 103 to control an operation of the integrated control circuit 103.

Similarly, when the multi-converter power supply 100B operates in the second power supply mode, the second feedback pin FB2 of the integrated control circuit 103 receives the second feedback signal VFB2 via the second isolated delivery path 32. The second feedback signal VFB2 is an error amplifying signal of the second output voltage Vo2. Specifically, the second isolated delivery path 32 includes a feedback resistor Rfb2, a photocoupler OC2, and a three-terminal adjustable voltage regulator device (integrated within the power delivery controller 105 as well). The photocoupler OC2 also comprises a photosensitive diode and a photosensitive transistor. When the multi-converter power supply 100B operates in the second power supply mode, the power delivery controller 105 provides the error amplifying signal of the second output voltage Vo2 to the second feedback pin FB2 of the integrated control circuit 103, the second feedback signal VFB2 is input to the switching control circuit 109 to control the operation thereof.

The mode indicating pin OCH of the integrated control circuit 103 receives the mode signal MS controlling the multi-converter power supply 100B to operate in the first power supply mode or the second power supply mode via the third isolated delivery path 33. In the embodiment shown in FIG. 3, the mode signal MS is related to the first output voltage Vo1. In other embodiments, the mode signal MS may be provided to the integrated control circuit 103 by other ways. Specifically, the third isolated delivery path 33 includes a feedback resistor Rfb3, a photocoupler OC3, and the three-terminal adjustable voltage regulator device (also integrated within the power delivery controller 105). When the multi-converter power supply 100B operates in the first power supply mode or the second power supply mode, the power delivery controller 105 provides a signal related to the first output voltage Vo1 to the mode indicating pin OCH of the integrated control circuit 103, and the signal is input to the integrated control circuit 103 to control the operation of the integrated control circuit 103.

Similarly, the feedback pin FB of the third controller 11 receives the third feedback signal VFB3 representing the third output voltage Vo3 via the fourth isolated delivery path 34. The fourth isolated delivery path 34 includes a feedback resistor Rfb4, a photocoupler OC4, and a three-terminal adjustable voltage regulator device (integrated within the power delivery controller 107). When the multi-converter power supply 100B operates in the first power supply mode, the third feedback signal VFB3 remains logic high level. When the third feedback signal VFB3 changes from logic high level to logic low level, it indicates that the third port USBC3 needs to be powered by the third switching converter 201.

Figure 4:
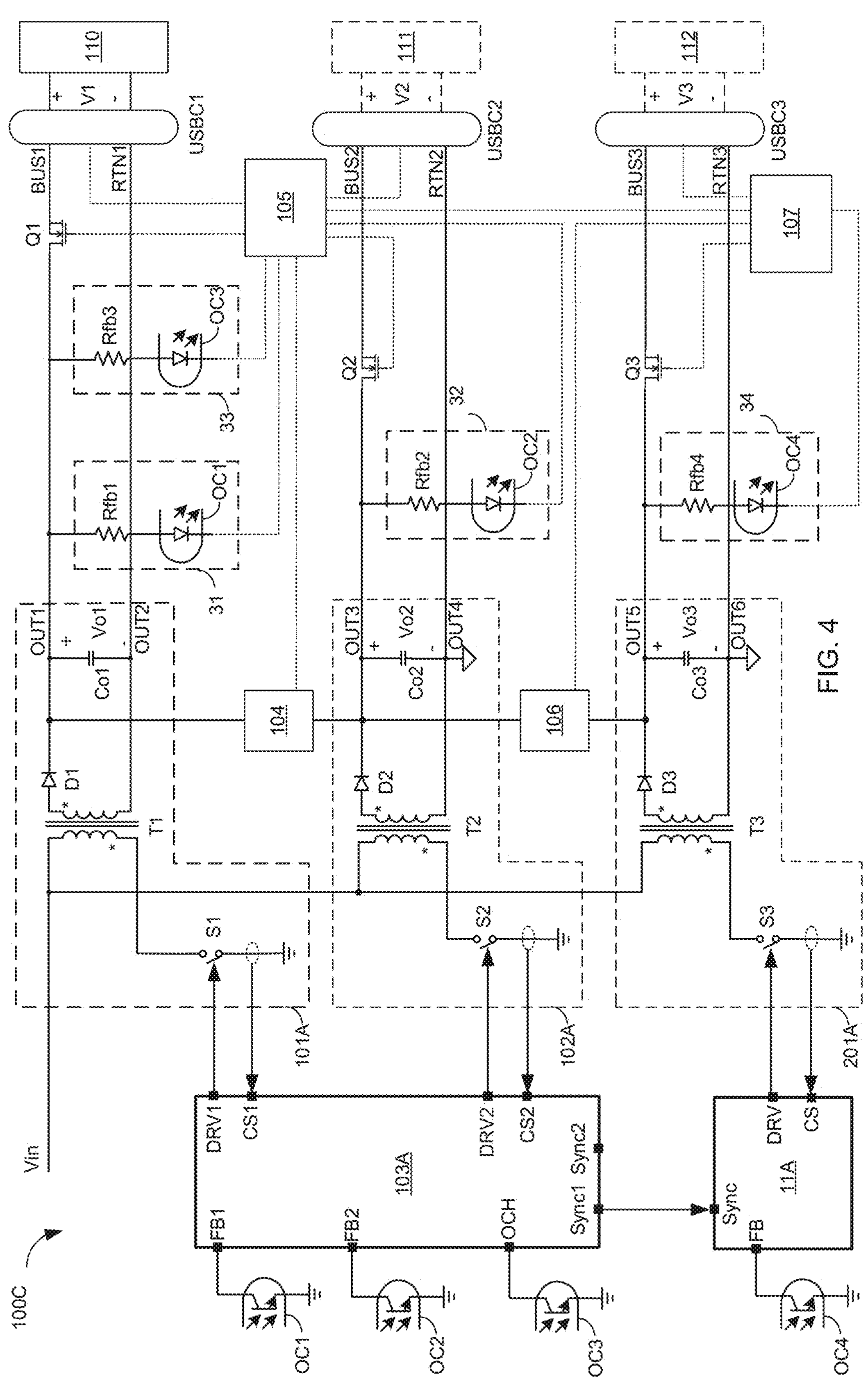
FIG. 4 schematically illustrates a circuit diagram of a multi-converter power supply 100C in accordance with an embodiment of the present invention.

FIG. 4 schematically illustrates a circuit diagram of a multi-converter power supply 100C in accordance with an embodiment of the present invention. The multi-converter power supply 100C includes a first switching converter 101A, a second switching converter 102A, a third switching converter 201A, a first port USBC1, a second port USBC2, a third port USBC3, and an integrated control circuit 103A. In the embodiment shown in FIG. 4, each of a first switching converter 101A, a second switching converter 102A and a third switching converter 201A are flyback circuits. And the first switching converter 101A comprises a switch S1, a transformer T1 and a diode D1, the second switching converter 102A comprises a switch S2, a transformer T2 and a diode D2, and the third switching converter 201A comprises a switch S3, a transformer T3 and a diode D3.

When the multi-converter power supply 100C operates in the first power supply mode, only the first port USBC1 is coupled to the first electronic device 110 or no load is coupled to each port. In response to the multi-converter power supply 100C operating in the first power supply mode, each converter of the multi-converter power supply 100C is configured to different operating modes depending on power levels required by the load. Specifically, when the first electronic device 110 is in the light load condition or no-load condition, only the first switching converter 101 is under power operation, and the second switching converter 102 is not under power operation. When the first electronic device 110 is in the medium load condition, the first switching converter 101 and the second switching converter 102 are reconfigured, so that their outputs are connected in series and the first switching converter 101 and the second switching converter 102 can operate interleaved with each other to provide double current load capability to the first electronic device 110. Therefore, the power supply requirements of the medium power load condition can be met. When the first electronic device 110 is in the heavy load condition, more switching converters, for example, the third switching converter 201 and/or the fourth switching converter 202 are further activated. The outputs of the third switching converter 201 and the fourth switching converter 202 operate in a way that their outputs are connected in parallel to provide increased load capacity. In other embodiments, more converters other than the third switching converter 201 and the fourth switching converter 202 may be further activated to provide power to a load coupled to the first port USBC1.

However, when the second port USBC2 is coupled to the second electronic device 111, the multi-converter power supply 100C is reconfigured, so that the outputs of the switching converters are connected in parallel, the inputs of the switching converters are independent from each other. Thereby, respective output voltages are provided for the first electronic device 110, the second electronic device 111 and even the third electronic device 112 (when the third port USBC3 is coupled to the third electronic device 112). So that the power supply requirements of multiple loads can be met.

Although the switching converters in the embodiment of FIG. 4 are all exemplified by flyback circuits, it will be understood by those skilled in the art that this is not intended to limit the present invention. The switching converters of the present invention may also be implemented using any other suitable topology, such as FORWARD, LLC resonant converter, AHB, and BUCK-BOOST, and the switches therein may also be implemented using any suitable controllable semiconductor device.

Figure 5:
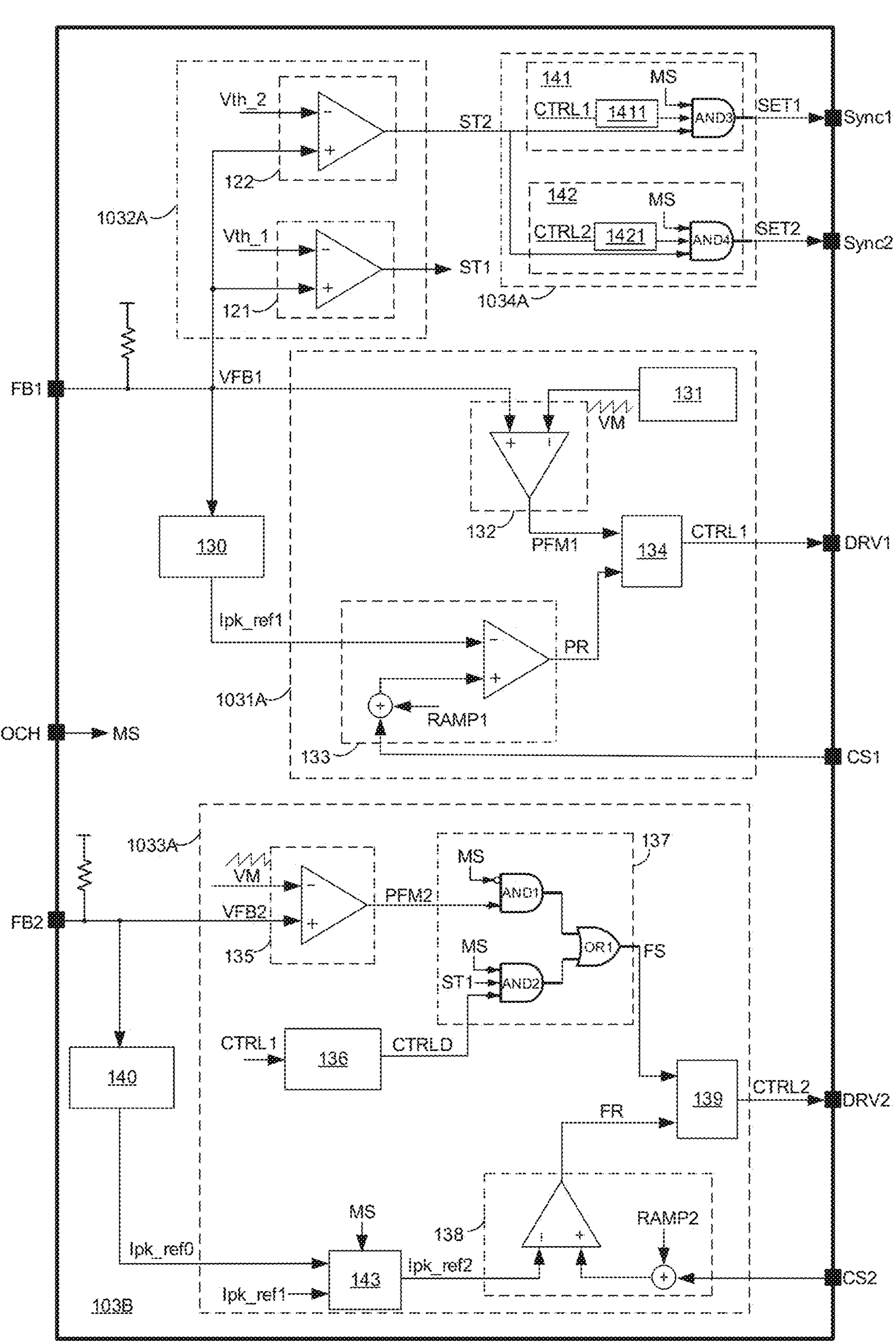
FIG. 5 schematically illustrates a circuit diagram of an integrated control circuit 103B in accordance with an embodiment of the present invention.

FIG. 5 schematically illustrates a circuit diagram of an integrated control circuit 103B in accordance with an embodiment of the present invention. As shown in FIG. 5, the integrated control circuit 103B includes a first switching control unit 1031A, a load condition detect unit 1032A, a first power distribution control unit 1033A, and a second power distribution control unit 1034A.

In the embodiment shown in FIG. 5, the first switching control unit 1031A includes a modulation signal generating circuit 131, a first comparison circuit 132, a second comparison circuit 133, and a first logic circuit 134.

The modulation signal generating circuit 131 is used to generate a modulation signal VM. In one embodiment, the modulation signal VM is a sawtooth wave signal. The first comparison circuit 132 has a first input terminal, a second input terminal and an output terminal. The first input terminal of the first comparison circuit 132 is coupled to the first feedback pin FB1 to receive the first feedback signal VFB1, the second input terminal of the first comparison circuit 132 is coupled to the modulation signal generating circuit 131 to receive the modulation signal VM. Based on the first feedback signal VFB1 and the modulation signal VM, the first comparison circuit 132 generates a comparison signal PFM1 at its output terminal to control turn-on of the switch S1 shown in FIG. 4.

The second comparison circuit 133 has a first input terminal, a second input terminal and an output terminal. The first input terminal of the second comparison circuit 133 receives a first current sense signal representing the current flowing through the switch S1, the second input terminal of the second comparison circuit 133 receives a threshold signal lpk_ref1. Based on the first current sense signal and the threshold signal lpk_ref1, the second comparison circuit 133 generates a comparison signal PR at its output terminal to control turn-off of the switch S1. In one embodiment, the first threshold signal lpk_ref1 is related to the first feedback signal VFB1. The integrated control circuit 103B further comprises a first current threshold generating circuit 130 coupled to the first feedback pin FB1, the first current threshold generating circuit 130 generates the first threshold signal lpk_ref1 based on the first feedback signal VFB1.

The first logic circuit 134 has a first input terminal, a second input terminal and an output terminal. The first input terminal of the first logic circuit 134 is coupled to the first comparison circuit 132 to receive the comparison signal PFM1, the second input terminal of the first logic circuit 134 is coupled to the second comparison circuit 133 to receive the comparison signal PR. Based on the comparison signal PFM1 and the second comparison signal PR, the first logic circuit 134 generates the control signal CTRL1 of the switch S1 at its output terminal, the control signal CTRL1 is output at the first driving terminal DRV1.

When the multi-converter power supply operates in the first power supply mode, the load condition detect unit 1032A is activated and configured to compare the first feedback signal VFB1 with the first feedback threshold Vth_1 and the second feedback threshold Vth_2 to judge the load condition of the first electronic device 110 coupled to the first port USBC1. And then the load condition detect unit 1032A provides the first condition signal ST1 and the second condition signal ST2 respectively. In the embodiment shown in FIG. 5, the load condition detect unit 1032A comprises a first threshold comparison circuit 121 and a second threshold comparison circuit 122.

The first threshold comparison circuit 121 has a first input terminal, a second input terminal and an output terminal. The first input terminal of the first threshold comparison circuit 121 receives the first feedback signal VFB1 varies with the load, the second input terminal of the first threshold comparison circuit 121 receives the first feedback threshold Vth_1. Based on the first feedback signal VFB1 and the first feedback threshold Vth_1, the first feedback comparison circuit 121 generates the first condition signal ST1 at its output terminal to determine whether to activate the second switching converter 102A when the multi-converter power supply operates in the first power supply mode. The second threshold comparison circuit 122 has a first input terminal, a second input terminal and an output terminal. The first input terminal of the second threshold comparison circuit 122 receives the first feedback signal VFB1, the second input terminal of the second threshold comparison circuit 122 receives the second feedback threshold Vth_2. Based on the first feedback signal VFB1 and the second feedback threshold Vth_2, the second feedback comparison circuit 122 generates the second condition signal ST2 at its output terminal to determine whether to activate the third switching converter 201A, and whether to provide the first set signal SET1 and the second set signal SET2 when the multi-converter power supply operates in the first power supply mode.

The first power distribution control unit 1033A includes a third comparison circuit 135, a phase shift control circuit 136, a logic selection circuit 137, a fourth comparison circuit 138, and a second logic circuit 139.

The third comparison circuit 135 has a first input terminal, a second input terminal and an output terminal. The first input terminal of the third comparison circuit 135 is coupled to the second feedback pin FB2 to receive the second feedback signal VFB2, the second input terminal of the third comparison circuit 135 is coupled to the modulation signal generating circuit 131 to receive the modulation signal VM. Based on the second feedback signal VFB2 and the modulation signal VM, the third comparison circuit 135 generates a comparison signal PFM2 at its output terminal to control turn-on of the switch S2 when the multi-converter power supply operates in the second power supply mode.

The phase shift control circuit 136 receives the first control signal CTRL1, performs phase shifting based on the first control signal CTRL1, and generates a phase shift control signal CTRLD to control the turn-on of the switch S2 when the multi-converter power supply operates in the first power supply mode and the first electronic device 110 is in the medium load condition. The time period required for the switch S1 to perform a complete switching action can be defined as one period. The phase shift control circuit 136 may turn on the switch S2 a half period after the switch S1 is turned on.

The logic selection circuit 137 is coupled to the mode indicating pin OCH for receiving the mode signal MS controlling the multi-converter power supply to operate in the first power supply mode or the second power supply mode. The logic selection circuit 137 is further coupled to the load condition detect unit 1032A for receiving the first condition signal ST1. Furthermore, based on the mode signal MS and the first condition signal ST1, the logic selection circuit 137 sets the phase shift control signal CTRLD output by the phase shift control circuit 136 or the comparison signal PFM2 output by the third comparison circuit 135 as a conduction control signal FS. In the embodiment shown in FIG. 5, the logic selection circuit 137 includes AND gate circuits AND1 and AND2 and an OR gate circuit OR1. Persons of ordinary skill in the art should appreciate that the logic selection circuit 137 may have any other circuit element or structure as long as functionality of the present invention can be implemented.

The fourth comparison circuit 138 has a first input terminal, a second input terminal and an output terminal. The first input terminal of the fourth comparison circuit 138 receives a second current sense signal characterizing a current flowing through the switch S2, the second input terminal of the fourth comparison circuit 138 receives a second threshold signal lpk_ref2. Based on the second current sense signal and the second threshold signal lpk_ref2, the fourth comparison circuit 138 generates a comparison signal FR at its output terminal to control the turn-off of the switch S2.

In the embodiment shown in FIG. 5, the integrated control circuit 103B further includes a second current threshold generating circuit 140 and a selection circuit 143. The second current threshold generating circuit 140 is coupled to the second feedback pin FB2 to receive the second feedback signal VFB2 and to provide a threshold signal lpk_ref0 at its output terminal. The selection circuit 143 has a first input terminal, a second input terminal and an output terminal. The first input terminal of the selection circuit 143 is coupled to the second current threshold generating circuit 140 to receive the threshold signal lpk_ref0, the second input terminal of the selection circuit 143 is coupled to the output terminal of the first current threshold generating circuit 130 to receive the first threshold signal lpk_ref0. Based on the mode signal MS, the selection circuit 143 selects the threshold signal lpk_ref0 or the first threshold signal lpk_ref1 as the second threshold signal lpk_ref2, and provides the second threshold signal lpk_ref2 to the output terminal of the selection circuit 143. When the multi-converter power supply operates in the first power supply mode, the second threshold signal lpk_ref2 is the same as the first threshold signal Ipk_ref1. When the multi-converter power supply operates in the second power supply mode, the second threshold signal lpk_ref2 is related to the second feedback signal VFB2 and generated by the second current threshold generating circuit 140 based on the second feedback signal VFB2. To maintain system stability, the second comparison circuit 133 and the fourth comparison circuit 138 often introduced with slope compensation signals, such as signals RAMP1 and RAMP2 shown in FIG. 5. The principles associated with slope compensation are well known to those skilled in the art and will not be described in detail herein.

The second logic circuit 139 has a first input terminal, a second input terminal and an output terminal. The first input terminal of the second logic circuit 139 is coupled to the logic selection circuit 137 to receive the selected conduction control signal FS, the second input terminal of the second logic circuit 139 is coupled to the fourth comparison circuit 138 to receive the comparison signal FR. Based on the conduction control signal FS and the comparison signal FR, the second logic circuit 139 generates the second control signal CTRL2 at its output terminal to control turn-on and turn-off of the switch S2.

In another embodiment, the logic selection circuit 137 and the second logic circuit 139 may be disposed in the same logic circuit. When the multi-converter power supply operates in the first power supply mode and the first electronic device 110 is in the light load condition, the switch S2 remained off. When the multi-converter power supply operates in the first power supply mode and the first electronic device 110 is in the medium load condition or the heavy load condition, the second control signal CTRL2 is generated based on the phase shift control signal CTRLD and the comparison signal FR. When the multi-converter power supply operates in the second power supply mode, the second control signal CTRL2 is generated based on the comparison signal PFM2 and the comparison signal FR.

In response to the multi-converter power supply operating in the second power supply mode, the second power distribution control unit 1034A is deactivated. In one embodiment, the second power distribution control unit 1034A includes a first synchronization control unit 141. When the multi-converter power supply operates in the first power supply mode and the first electronic device 110 is in the light load condition or the medium load condition, the first synchronization control unit 141 remains the first set signal SET1 at zero, in other word, the first synchronization control unit 141 remains the first set signal SET1 with a first status. When the multi-converter power supply operates in the first power supply mode and the first electronic device 110 is in the heavy load condition, the first synchronization control unit 141 provides the first set signal SET1 (in other word, the first synchronization control unit 141 provides the first set signal SET1 with a second status) to the first output pin Sync1 of the integrated control circuit 103B based on the first control signal CTRL1. In the embodiment shown in FIG. 5, the first synchronization control unit 141 comprises a one-shot circuit 1411 receiving rising edge of the first control signal CTRL1 and an AND gate circuit AND3.

In another embodiment, the second power distribution control unit 1034A further includes a second synchronization control unit 142. When the multi-converter power supply operates in the first power supply mode and the first electronic device 110 is in the light load condition or the medium load condition, the second set signal SET2 remained at zero, in other word, the second synchronization control unit 142 remains the second set signal SET2 with a first status. When the multi-converter power supply operates in the first power supply mode and the first electronic device 110 is in the heavy load condition, the second synchronization control unit 142 provides the second set signal SET2 (in other word, the second synchronization control unit 142 provides the second set signal SET2 with a second status) to the second output pin Sync2 of the integrated control circuit 103B based on the second control signal CTRL2. In the embodiment shown in FIG. 5, the second synchronization control unit 142 comprises a one-shot circuit 1421 receiving rising edge of the second control signal CTRL1 and an AND gate AND4.

Figure 6:
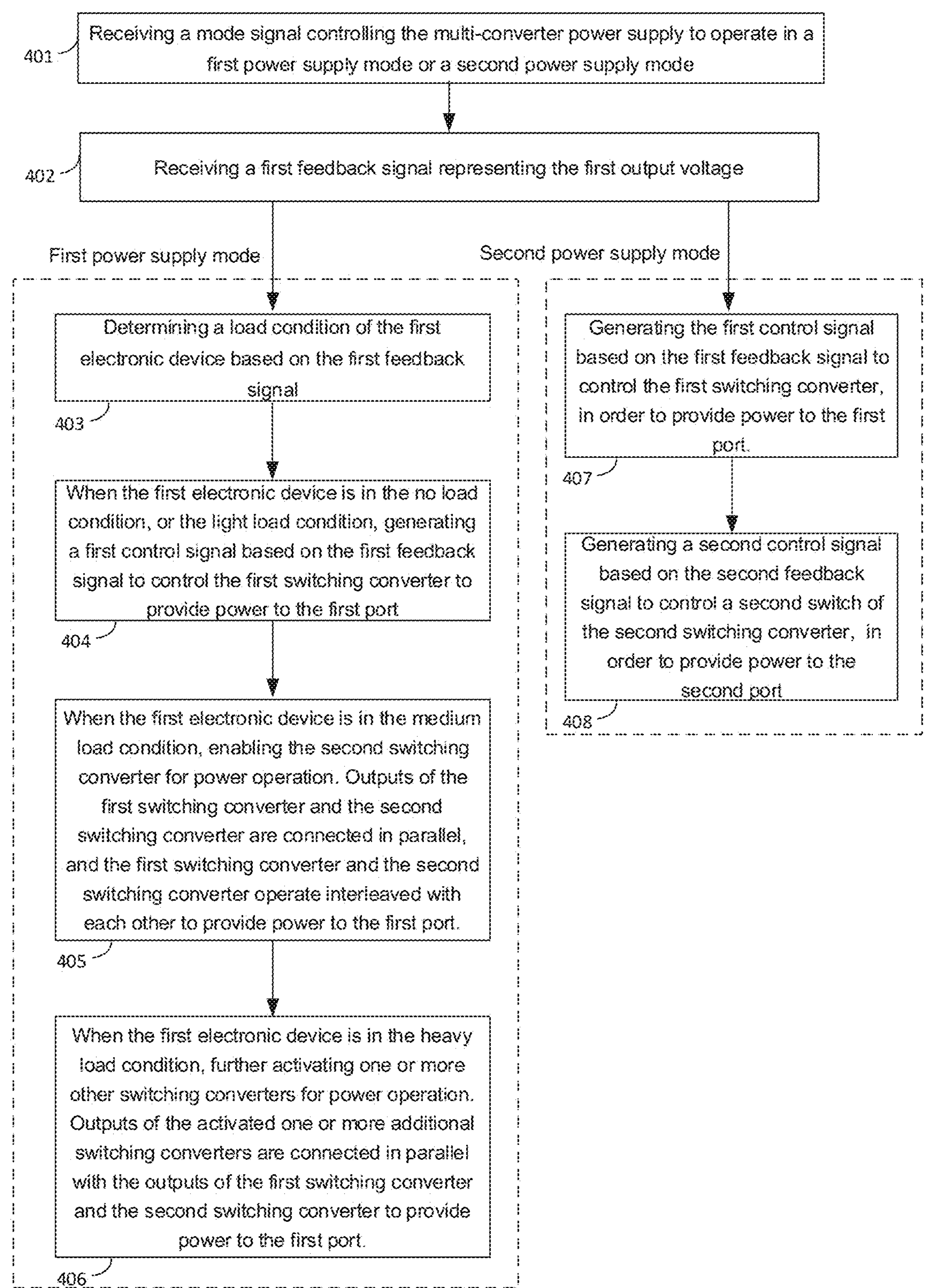
FIG. 6 schematically illustrates a flowchart of a control method for a multi-converter power supply in accordance with an embodiment of the present invention.

FIG. 6 schematically illustrates a flowchart of a control method for a multi-converter power supply in accordance with an embodiment of the present invention. The multi-converter power supply includes a first port and a second port for supplying power to a single load or multiple loads, a first switching converter and a second switching converter and one or more other switching converters (i.e., one or more additional converters) that might be activated. The first switching converter converts an input voltage to a first output voltage and the second switching converter converts the input voltage to a second output voltage. The control method comprises steps 401 to 408.

At the step 401, receiving a mode signal controlling the multi-converter power supply to operate in a first power supply mode or a second power supply mode. In one embodiment, the mode signal is provided by a power delivery controller coupled to the first port and the second port. In one embodiment, when the multi-converter power supply operates in the first power supply mode, only the first port is coupled to the first electronic device or none of the ports are coupled to the electronic device(s) (i.e., no load). When the multi-converter power supply operates in the second power supply mode, the first port is coupled to the first electronic device while the second port is coupled to the second electronic device.

At the step 402, receiving a first feedback signal representing the first output voltage. In one embodiment, a first feedback signal is provided by the power delivery controller coupled to the first port and the second port.

In response to the multi-converter power supply operating in the first power supply mode, the control method entering steps 403 to 406.

At the step 403, when the multi-converter power supply operates in the first power supply mode, determining a load condition of the first electronic device based on the first feedback signal. The first feedback signal is a signal that varies with the load.

At the step 404, when the first electronic device is in the no load condition, or the light load condition, generating a first control signal based on the first feedback signal to control the first switching converter to provide power to the first port.

At the step 405, when the first electronic device is in the medium load condition, activating the second switching converter for power operation. Outputs of the first switching converter and the second switching converter are connected in parallel, and the first switching converter and the second switching converter operate interleaved with each other to provide power to the first port.

At the step 406, when the first electronic device is in the heavy load condition, further activating one or more other switching converters (i.e., one or more additional switching converters) for power operation. Outputs of the activated one or more additional switching converters are connected in parallel with the outputs of the first switching converter and the second switching converter to provide power to the first port.

In response to the multi-converter power supply operating in the second power supply mode, the control method entering steps 407 to 408.

At the step 407, generating the first control signal based on the first feedback signal to control the first switching converter, in order to provide power to the first port.

At the step 408, receiving a second feedback signal representing the second output voltage, and generating a second control signal based on the second feedback signal to control a second switch of the second switching converter, the second switching converter is configured to provide power to the second port.

In one embodiment, a method of generating a second control signal for controlling a second switching converter comprises: phase-shifting a first control signal to generate a phase shift control signal; generating a third comparison signal based on a modulation signal and a second feedback signal; generating a fourth comparison signal based on a second current sense signal characterizing a current flowing through the second switch and a second threshold signal; and remaining the second switch off when a multi-converter power supply operates in a first power supply mode and a first electronic device is in the light load condition, generating the second control signal based on the phase shift control signal and the fourth comparison signal when the multi-converter power supply operates in the first power supply mode and the first electronic device is in the medium load condition or the heavy load condition, generating the second control signal based on the third comparison signal and the fourth comparison signal when the multi-converter power supply operates in the second power supply mode.

In another embodiment, a set signal is remained at zero (in other word, the set signal is remained with a first status) when a multi-converter power supply operates in a first power mode and a first electronic device is in a light load condition or medium load condition; the set signal is remained at zero (in other word, the set signal is remained with the first status) when the multi-converter power supply operates in a second power supply mode; and providing the set signal based on a first control signal or a second control signal when the multi-converter power supply operates in the first power mode and the first electronic device is in the heavy load condition, in this case, the set signal is in a second status.

Obviously, many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

I claim:

1. An integrated control circuit for a multi-converter power supply, the integrated control circuit comprising:

a first pin configured to receive a mode signal, wherein the mode signal is configured to control the multi-converter power supply to operate in a first power supply mode or a second power supply mode;

a second pin configured to receive a first feedback signal representing a first output voltage provided by a first switching converter of the multi-converter power supply;

one or more output pins configured to provide one or more set signals;

a load condition detect unit configured to judge a load condition at a first port of the multi-converter power supply based on the first feedback signal;

a first switching control unit configured to generate a first control signal based on the first feedback signal for controlling a first switch of the first switching converter;

a first power distribution control unit configured to determine whether to activate a second switching converter of the multi-converter power supply based on the load condition when the multi-converter power supply operates in the first power supply mode, wherein when the second switching converter is activated, the outputs of the second switching converter and the first switching converter are connected in parallel, and the second switching converter and the first switching converter operate interleaved with each other to provide power for the first port; and a second power distribution control unit configured to determine whether to activate one or more additional switching converters of the multi-converter power supply based on the load condition when the multi-converter power supply operates in the first power supply mode, the second power distribution control unit is further configured to generate the one or more set signals, wherein when the one or more additional switching converters are activated, output terminals of the one or more additional switching converters are connected in parallel with output terminals of the first switching converter and the second switching converter to provide power to the first port.

2. The integrated control circuit of claim 1, wherein:

when a second port of the multi-converter power supply is floating, the multi-converter power supply is controlled to operate in the first power supply mode;

when the first port is coupled to a first load and the second port is coupled to a second load, the multi-converter power supply is controlled to operate in the second power supply mode.

3. The integrated control circuit of claim 1, wherein the first switching control unit comprises:

a modulation signal generating circuit configured to generate a modulation signal;

a first comparison circuit coupled to the modulation signal generating circuit, wherein the first comparison circuit is configured to generate a first comparison signal based on the modulation signal and the first feedback signal;

a second comparison circuit configured to generate a second comparison signal based on a first current sense signal representing a current flowing through the first switch and a first threshold signal; and a first logic circuit coupled to the first comparison circuit and the second comparison circuit, wherein the first logic circuit is configured to generate the first control signal based on the first comparison signal and the second comparison signal.

4. The integrated control circuit of claim 3, further comprising:

a third pin configured to receive a second feedback signal representing a second output voltage provided by the second switching converter; wherein when the multi-converter power supply operates in the second power supply mode, the first power distribution control unit is configured to receive the second feedback signal, and generate a second control signal based on the second feedback signal to control a second switch of the second switching converter.

5. The integrated control circuit of claim 4, wherein the first power distribution control unit comprises:

a phase-shift control circuit configured to phase-shift the first control signal to generate a phase-shift control signal;

a third comparison circuit coupled to the modulation signal generating circuit, wherein the third comparison circuit is configured to generate a third comparison signal based on the modulation signal and the second feedback signal;

a fourth comparison circuit configured to generate a fourth comparison signal based on a second current sense signal representing a current flowing through the second switch and a second threshold signal; and a second logic circuit coupled to the phase-shift control circuit, third comparison circuit and fourth comparison circuit, wherein:

when the multi-converter power supply operates in the first power supply mode and a light load condition is detected, the second logic circuit is configured to keep the second switch off;

when the multi-converter power supply operates in the first power supply mode and a medium load condition or a heavy load condition is detected, the second logic circuit is configured to generate the second control signal based on the phase shift control signal and the fourth comparison signal; and when the multi-converter power supply operates in the second power supply mode, the second logic circuit is configured to generate the second control signal based on the third comparison signal and the fourth comparison signal.

6. The integrated control circuit of claim 4, wherein the second power distribution control unit is deactivated when the multi-converter power supply operates in the second power supply mode.

7. The integrated control circuit of claim 6, wherein the second power distribution control unit comprises:

a first synchronization control unit configured to provide a first set signal to a first output pin of the integrated control circuit, wherein when the multi-converter power supply operates in the first power supply mode and a light load condition or medium load condition is detected, the first synchronization control unit is configured to keep the first set signal at a first status, and wherein when the multi-converter power supply operates in the first power supply mode and a heavy load condition is detected, the first synchronization control unit is configured to provide the first set signal with a second status based on the first control signal; and a second synchronization control unit configured to provide a second set signal to a second output pin of the integrated control circuit, when the multi-converter power supply operates in the first power supply mode and the light load condition or medium load condition is detected, the second synchronization control unit is configured to keep the second set signal at a first status, and wherein when the multi-converter power supply operates in the first power supply mode and the heavy load condition is detected, the second synchronization control unit is configured to provide the second control signal with a second status based on the second control signal.

8. A multi-converter power supply, comprising:

a first port;

a second port;

a first switching converter configured to receive an input voltage and to convert the input voltage into a first output voltage;

a second switching converter configured to receive the input voltage and to convert the input voltage into a second output voltage;

one or more additional switching converters configured to be selectively activated; and an integrated control circuit, comprising:

a first pin configured to receive a mode signal, wherein the mode signal is configured to control the multi-converter power supply to operate in a first power supply mode or a second power supply mode;

a second pin configured to receive a first feedback signal representing the first output voltage;

one or more output pins configured to provide one or more set signals;

a load condition detect unit configured to judge a load condition at the first port based on the first feedback signal;

a first switching control unit configured to generate a first control signal based on the first feedback signal for controlling a first switch of the first switching converter;

a first power distribution control unit configured to determine whether to activate the second switching converter based on the load condition when the multi-converter power supply operates in the first power supply mode, wherein when the second switching converter is activated, the outputs of the second switching converter and the first switching converter are connected in parallel, and the second switching converter and the first switching converter operate interleaved with each other to provide power for the first port; and a second power distribution control unit configured to determine whether to activate one or more additional switching converters of the multi-converter power supply based on the load condition when the multi-converter power supply operates in the first power supply mode, the second power distribution control unit is further configured to generate the one or more set signals, wherein when the one or more additional switching converters are activated, output terminals of the one or more additional switching converters are connected in parallel with output terminals of the first switching converter and the second switching converter to provide power to the first port.

9. The multi-converter power supply of claim 8, further comprising one or more additional controllers, wherein each additional convertor is configured to generate a control signal to control a power switch of a corresponding additional switching converter, each additional controller comprises:

a synchronization pin coupled to an output pin of the integrated control circuit, when the multi-converter power supply operates in a first power supply mode and when a heavy load condition is detected, the synchronization pin is configured to receive the set signal;

a feedback pin configured to receive a feedback signal representing the output voltage of the additional switching converter;

a drive pin configured to provide an additional control signal; and a switching control circuit configured to generate the additional control signal based on the set signal when the set signal is received, and to generate the additional control signal based on the feedback signal when the set signal is not received within a preset time period and the feedback signal is detected to change from a first logic level to a second logic level.

10. The multi-converter power supply of claim 8, further comprising:

a power delivery controller coupled to the first port and the second port, wherein the power delivery controller is configured to generate the mode signal controlling the multi-converter power supply to operate in the first power supply mode or the second power supply mode in response to load information received from the first port and the second port, and to provide the mode signal to the first pin of the integrated control circuit; and a first isolated delivery path having a first end, a second end, and a control end, wherein the first end is coupled to the first switching converter to receive the first output voltage, the second end is coupled to the second pin of the integrated control circuit to provide the first feedback signal, and the control end is coupled to the power delivery controller, wherein the first feedback signal is an error amplified signal of the first output voltage.

11. The multi-converter power supply of claim 8, wherein the first port and the second port are both USB Type-C ports.

12. The multi-converter power supply of claim 8, wherein:

when a second port of the multi-converter power supply is floating, the multi-converter power supply is controlled to operate in the first power supply mode;

when the first port is coupled to a first load and the second port is coupled to a second load, the multi-converter power supply is controlled to operate in the second power supply mode.

13. The multi-converter power supply of claim 12, wherein the first switching control unit comprises:

a modulation signal generating circuit configured to generate a modulation signal;

a first comparison circuit coupled to the modulation signal generating circuit, wherein the first comparison circuit is configured to generate a first comparison signal based on the modulation signal and the first feedback signal;

a second comparison circuit configured to generate a second comparison signal based on a first current sense signal characterizing a current flowing through the first switch and a first threshold signal; and a first logic circuit, coupled to the first comparison circuit and the second comparison circuit, wherein the first logic circuit is configured to generate the first control signal based on the first comparison signal and the second comparison signal.

14. The multi-converter power supply of claim 13, wherein the integrated control circuit further comprises:

a third pin configured to receive a second feedback signal representing a second output voltage provided by the second switching converter; wherein when the multi-converter power supply operates in the second power supply mode, the first power distribution control unit is configured to receive the second feedback signal, and generate a second control signal based on the second feedback signal to control a second switch of the second switching converter.

15. The multi-converter power supply of claim 14, wherein the second power distribution control unit is deactivated when the multi-converter power supply operates in the second power supply mode.

16. A control method for a multi-converter power supply, the control method comprising:

receiving a mode signal, wherein the mode signal controls the multi-converter power supply to operate in a first power supply mode or a second power supply mode;

receiving a first feedback signal representing a first output voltage provided by a first switching converter of the multi-converter power supply;

determining a load condition at a first port of the multi-converter power supply based on a first feedback signal when the multi-converter power supply operates in the first power supply mode; wherein when a light load condition is detected, generating a first control signal based on the first feedback signal to control a first switching converter of the multi-converter power supply to provide power to the first port;

when a medium load condition is detected, activating a second switching converter of the multi-converter power supply to perform power operation, wherein when the second switching converter is activated, outputs of the first switching converter and the second switching converter are connected in parallel, and the first switching converter and the second switching converter operate interleaved with each other to provide power for the first port; and when a heavy load condition is detected, activating one or more additional switching converters to perform power operation, wherein when the one or more additional switching converters are activated, outputs of the additional switching converter, the first switching converter and the second switching converter are connected in parallel to provide power to the first port.

17. The control method of claim 16, wherein:

when a second port of the multi-converter power supply is floating, the multi-converter power supply is controlled to operate in the first power supply mode, when the first port is coupled to a first load and the second port is coupled to a second load, the multi-converter power supply is controlled to operate in the second power supply mode.

18. The control method of claim 17, wherein when the multi-converter power supply operates in the second power supply mode, receiving a second feedback signal representing a second output voltage provided by the second switching converter and generating a second control signal based on the second feedback signal to control a second switching converter to provide power to the second port.

19. The control method of claim 18, wherein a method of generating the second control signal comprises:

phase-shifting the first control signal to generate a phase shift control signal;

generating a first comparison signal based on a modulation signal and the second feedback signal;

generating a second comparison signal based on a current sense signal characterizing a current flowing through a second switch of the second switching converter and a threshold signal;

when the multi-converter power supply operates in the first power supply mode and the light load condition is detected, keeping the second switching converter deactivated;

when the multi-converter power supply operates in the first power supply mode and the medium load condition or heavy load condition is detected, generating the second control signal based on the phase shift control signal and the second comparison signal; and when the multi-converter power supply operates in the second power supply mode, generating the second control signal based on the first comparison signal and the second comparison signal.

20. The control method of claim 18, wherein:

when the multi-converter power supply operates in the first power supply mode and the light load condition or medium load condition is detected, keeping the set signal with a first status;

when the multi-converter power supply operates in the second power supply mode, keeping the set signal with the first status; and wherein when the multi-converter power supply operates in the first power supply mode and the heavy load condition is detected, providing the set signal with a second status based on the first control signal or the second control signal.

* * * * *